Oct. 17, 1939.  W. P. SIMPSON ET AL  2,176,750

SUPERVISORY CONTROL SYSTEM

Original Filed Aug. 19, 1936  4 Sheets—Sheet 1

Inventors:
Waldo P. Simpson,
Clyde E. Stewart,
by Harry E. Dunham
Their Attorney.

Inventors:
Waldo P. Simpson,
Clyde E. Stewart,
by Harry C. Dunham
Their Attorney.

Patented Oct. 17, 1939

2,176,750

UNITED STATES PATENT OFFICE 2,176,750

SUPERVISORY CONTROL SYSTEM

Waldo P. Simpson, Drexel Hill, and Clyde E. Stewart, Upper Darby, Pa., assignors to General Electric Company, a corporation of New York Application August 19, 1936, Serial No. 96,846
Renewed March 11, 1939

9 Claims. (Cl. 177—353)

Our invention relates to supervisory control systems and particularly to an improved two-wire supervisory control system for controlling a relatively small number of remote apparatus units.

One object of our invention is to provide an improved arrangement for selecting a desired apparatus unit and checking the selection before the selected apparatus unit can be operated.

Another object of our invention is to provide an arrangement whereby the indicating means which normally displays at the dispatcher's office an indication corresponding to the position of each apparatus unit is controlled so that when a selecting operation is initiated, the indicating means individual to the desired apparatus unit is controlled so that it displays no position indication until the desired apparatus unit has been selected, when the indicating means is operated in accordance with the position then occupied by the selected unit.

Another object of our invention is to provide an arrangement whereby each operation of the master operating key at the dispatcher's office, after an apparatus unit has been selected, effects the operation of the indicating means individual to the selected unit so that it does not display any position indication until the selected apparatus unit has moved to its new position in response to the operation of the master operating key and has transmitted back to the dispatcher's office an indication impulse corresponding to its new position.

Other features of our invention will appear, and our invention will be better understood from the following description when taken in connection with the accompanying drawings, and its scope will be pointed out in the appended claims.

Figure 1:
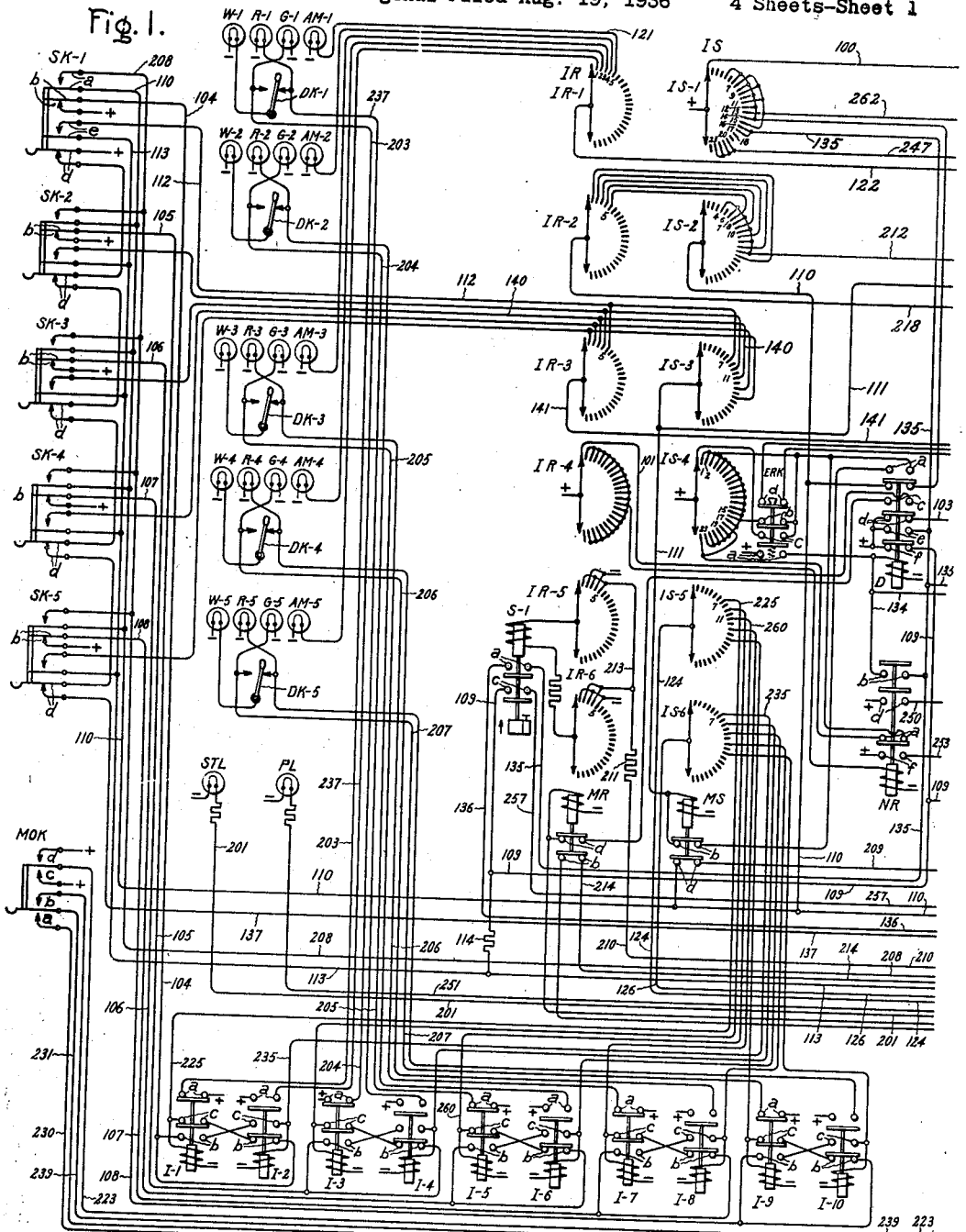
Figure 2:
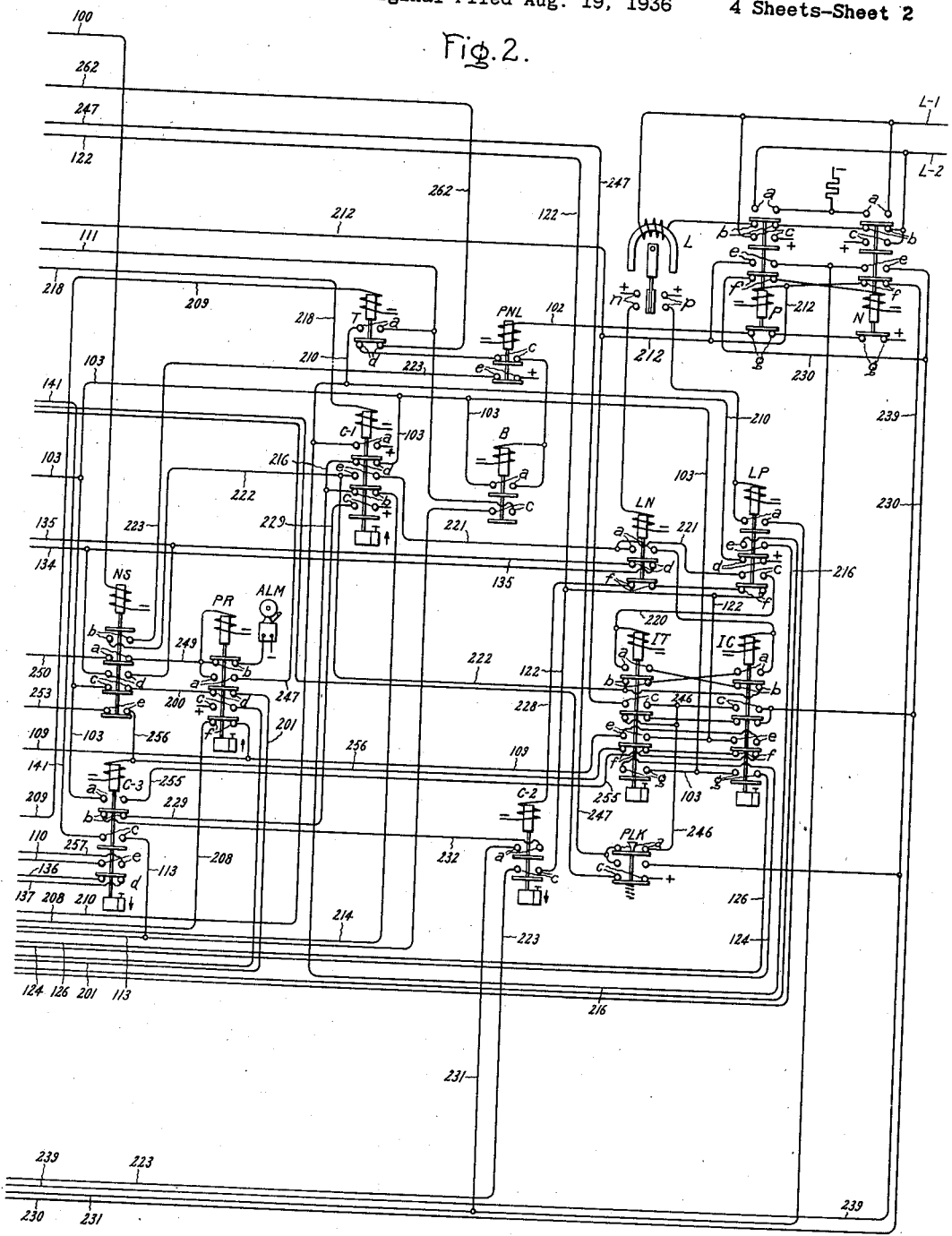
Figure 3:
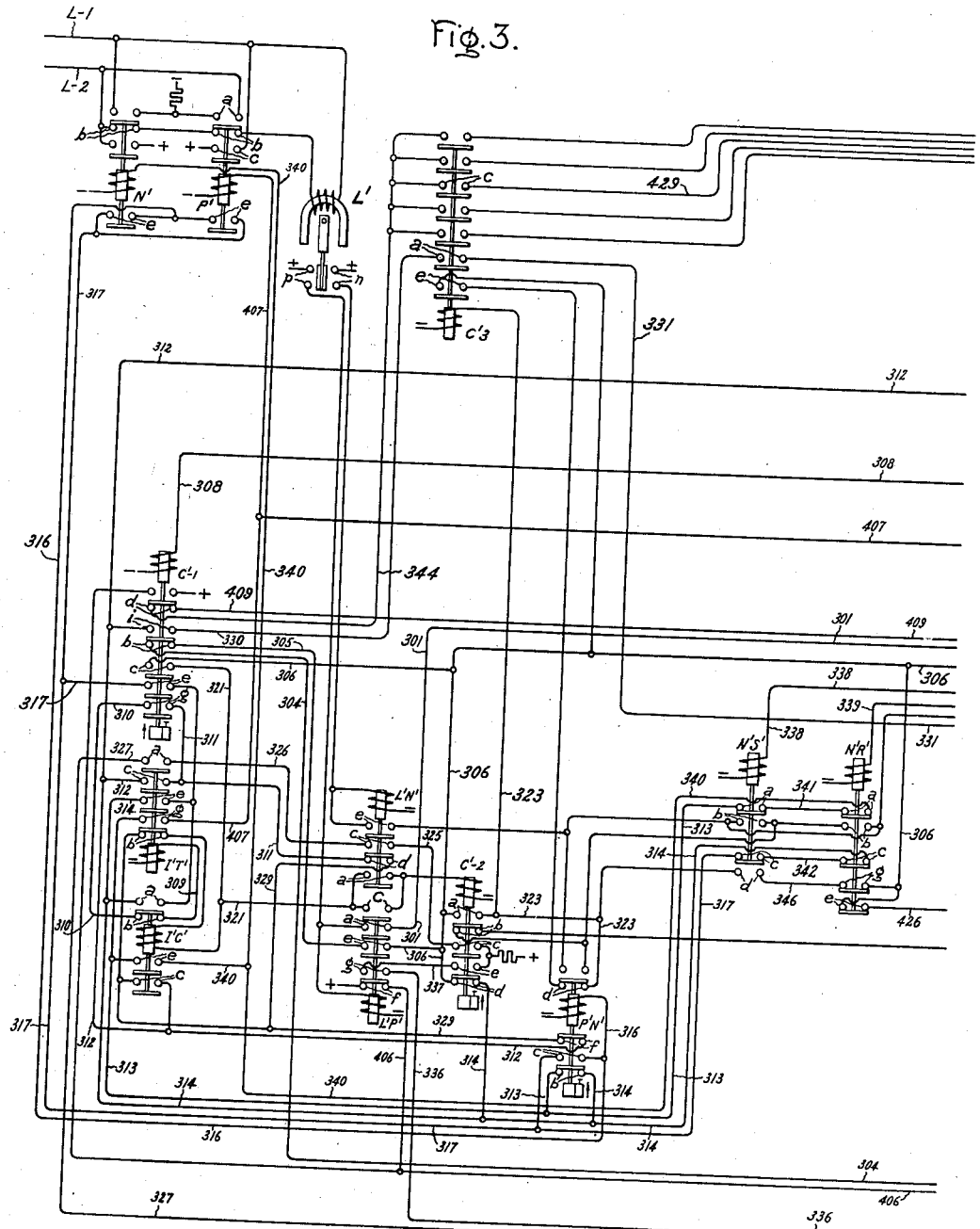
Figure 4:
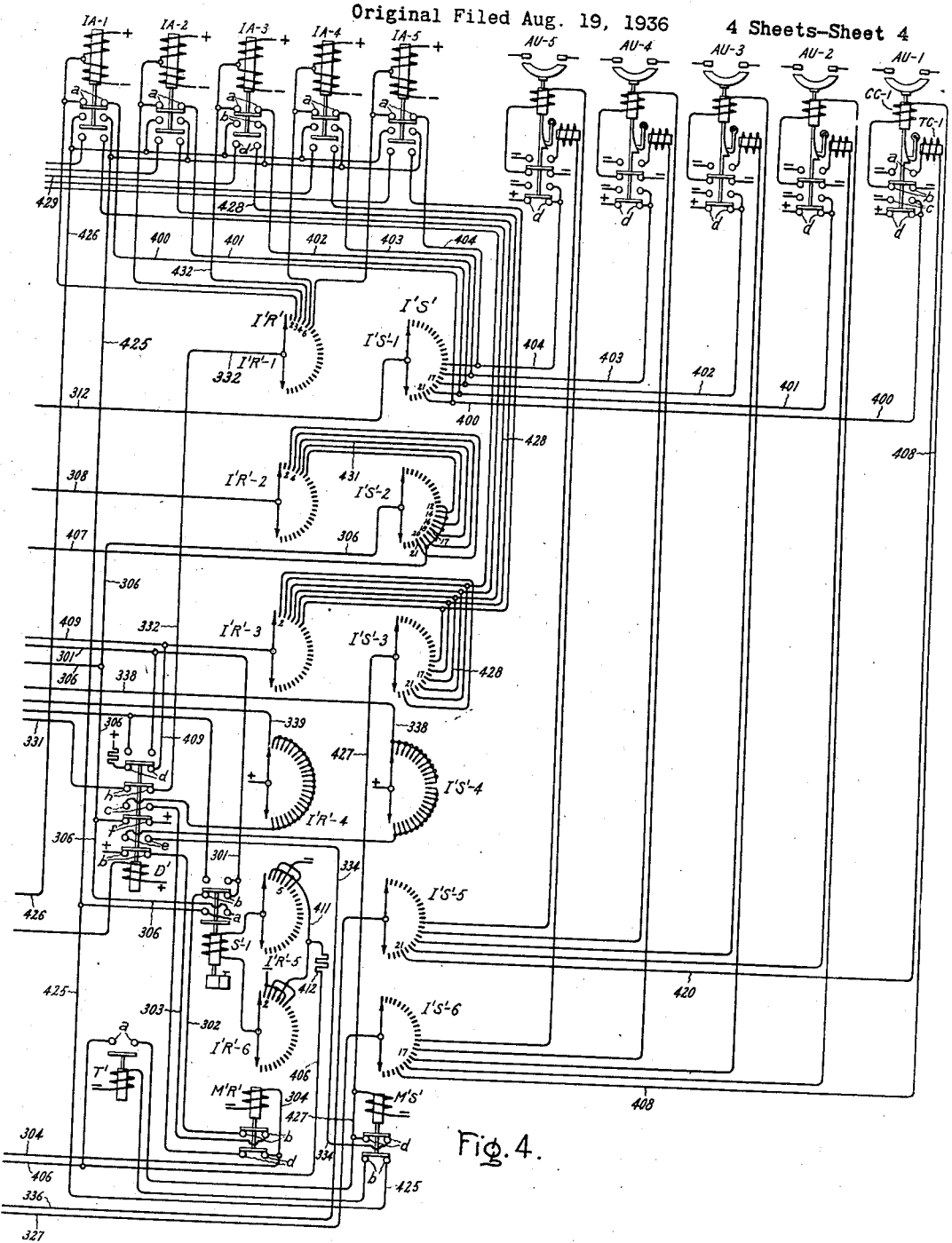

In the embodiment of our invention shown in the drawings, which comprises Figs. 1 to 4, inclusive, the supervisory control system is designed to provide control and indication of five remote apparatus units shown in Fig. 4 as circuit breakers AU—1 to AU—5, inclusive. The apparatus and circuits shown in Figs. 1 and 2 are those located in the control or dispatcher's office while the apparatus and circuits shown in Figs. 3 and 4 are those located at the remote station, which is connected to the dispatcher's office by two line conductors L—1 and L—2.

At the dispatcher's office there is provided a separate group of control keys and indicating lamps for each apparatus unit to be selected and controlled in the remote station. Each group of keys includes a two-position select key, such as SK—1, for apparatus unit AU—1, SK—2 for apparatus unit AU—2, etc., which is operated by the dispatcher when he desires to select a corresponding apparatus unit for operation, and a two-position disagreement key, such as DK—1 for apparatus unit AU—1, DK—2 for apparatus unit AU—2, etc., which controls the operation of the corresponding indicating lamps W—1, W—2, etc. Each group of indicating lamps includes a red lamp, such as R—1 for apparatus unit AU—1, R—2 for apparatus unit AU—2, etc., which, when lighted, indicates that the corresponding apparatus unit is in its closed position; a green lamp, such as G—1 for apparatus unit AU—1, G—2 for apparatus unit AU—2, etc., which, when lighted, indicates that the corresponding apparatus unit is in its open position; a white lamp, such as W—1 for apparatus unit AU—1, W—2 for apparatus unit AU—2, etc., which, when lighted, indicates that the position of the corresponding apparatus unit does not correspond with the position of the associate disagreement key; and an amber lamp, such as AM—1 for apparatus unit AU—1, AM—2 for apparatus unit AU—2, etc., which, when lighted, indicates that the corresponding apparatus unit has been properly selected for operation. Each group of keys and lamps has associated therewith an individual pair of indicating relays, such as I—1 and I—2 for the group individual to apparatus unit AU—1, I—3 and I—4 for the group individual to apparatus unit AU—2, etc., which determine by their positions whether the associate red or green lamp is lighted and which co-operate with the associate disagreement key to determine whether the associate white lamp is lighted. The positions of each pair of indicating relays in turn are determined by the position of the corresponding apparatus unit in a manner which will be hereinafter described. As shown in Fig. 1, indicating relays I—1, I—3, I—5, I—7, and I—9 are energized, and the indicating relays I—2, I—4, I—6, I—8, and I—10 are de-energized. These are the positions occupied by the indicating relays when all of the apparatus units at the remote station are in their open positions. The disagreement keys DK—1 to DK—5, inclusive, are also shown in the positions corresponding to the open positions of the respective apparatus units so that only the green lamps G—1 to G—5, inclusive, are lighted and all of the white and red lamps are not lighted. It will be seen that if any of the disagreement keys should be moved to its other position, the associate white lamp would be connected in parallel with the associate green lamp and therefore would be lighted.

In order that the operation of any select key may effect the selection of the corresponding apparatus unit, a suitable code sender IS is provided at the dispatcher's office for transmitting to the remote station over the line conductors L—1 and L—2 a series of current impulses of the same polarity, the number of impulses in each series varying with the unit to be selected. The code sender IS preferably is a rotary selector switch of the well-known type which comprises a plurality of banks of twenty-five contacts, each bank having associated therewith a co-operating wiper. A suitable operating magnet is provided for simultaneously moving all of the wipers of the switch in a step by step movement over the stationary contacts of the respective banks. Any other suitable switching means, examples of which are well-known in the art, may be used, however. As shown in Fig. 1, the switch IS consists of six banks, IS—1 to IS—6, inclusive, a co-operating wiper for each bank and an operating magnet MS. In the drawings, the normal or reset position of switch IS and of similar switches is designated as position O and each of the other positions thereof is designated by the number corresponding to the number of current impulses required to move the switch from its normal position to the position in question.

Normally, the switch IS is in its zero or normal position as shown in the drawings. When any one of the select keys SK—1 to SK—5, inclusive, is operated, the switch IS is automatically operated to another of its positions which is individual to the operated select key and during this movement of the switch IS, it effects the transmission of a series of positive impulses over the line conductors L—1 and L—2. In the particular arrangement shown, when the select key SK—1 is operated, the switch IS moves to its position 7; when the switch SK—2 is operated, the switch IS moves to its position 9; when the select key SK—3 is operated, the switch IS moves to its position 11; when the select key SK—4 is operated, the switch IS moves to its position 13, and when the select key SK—5 is operated, the switch IS moves to its position 15. While the switch IS is moving through its positions 4, 6, 8, 10, 12, and 14, it effects the transmission of a positive impulse over the line conductors L—1 and L—2 to the remote station. Therefore, when the select key SK—1 is operated, a series of two positive impulses is transmitted over the line conductors L—1 and L—2; when the select key SK—2 is operated, a series of three positive impulses is transmitted; when the select key SK—3 is operated, a series of four positive impulses is transmitted; when the select key SK—4 is operated, a series of five positive impulses is transmitted, and when the select key SK—5 is operated, a series of six positive impulses is transmitted. When the select key SK—1 has been operated, the series of two selecting impulses transmitted over the line conductors L—1 and L—2 effects the movement of the receiver switch I'R' at the remote station to its position 2, which is the position thereof allotted to the apparatus unit AU—1. Similarly, when the select switch SK—2 is operated, the receiver switch I'R' is moved to its position 3, which is allotted to apparatus unit AU—2; when the select switch SK—3 is operated, the receiver switch I'R' is moved to its position 4, which is allotted to apparatus unit AU—3; when the select switch SK—4 is operated, the receiver switch I'R' is moved to its position 5, which is allotted to apparatus unit AU—4, and when the select switch SK—5 is operated, the receiver switch I'R' is moved to its position 6, which is allotted to the apparatus unit AU—5.

After this series of selecting impulses has been transmitted to effect the selection of the desired apparatus unit, a code sender I'S' at the remote station is operated to transmit over the line conductors L—1 and L—2 a check code of positive impulses corresponding to the selected apparatus unit. This code sender I'S' is shown as a rotary selector switch having six banks of twenty-five stationary contacts I'S'—1 to I'S'—6, inclusive, and an operating magnet M'S'.

In accordance with our invention, the sum of the impulses in the select and check codes for each apparatus unit is the same, and in the particular embodiment of our invention shown in the drawings this sum is 7. Therefore, in the arrangement shown, when the apparatus unit AU—1 has been selected, the code sender I'S' transmits over the line conductors L—1 and L—2 to the dispatcher's office a check code consisting of a series of five positive impulses. Similarly, the check codes for the apparatus units AU—2 to AU—5, inclusive, are 4, 3, 2, and 1 positive impulses, respectively. After the check code has been transmitted, a polarity indication impulse corresponding to the position of the selected apparatus unit is transmitted over the line conductors. If the selected apparatus unit is in its open position, the indication impulse is a positive impulse, whereas if the apparatus unit is in its closed position, the indication impulse is a negative impulse.

At the dispatcher's office, the check code effects the operation of a line relay L, which is a three-positioned polarized relay. Each operation of this line relay L in response to each positive impulse of the check code effects the operation of the motor magnet MR of a receiver switch IR. This receiver switch is shown as a rotary selector switch comprising six banks of twenty-five contacts IR—1 to IR—6, inclusive.

If the apparatus unit AU—1 has been selected so that the check code consists of five positive impulses, the receiver switch IR is moved to its position 5 in response to this check code. Similarly, the switch IR is moved to its position 4 if the apparatus unit AU—2 has been selected; to its position 3 if the apparatus unit AU—3 has been selected; to its position 2 if the apparatus unit AU—4 has been selected, and to its position 1 if the apparatus unit AU—5 has been selected.

If the switches IR and IS in the dispatcher's office occupy the proper positions after the check code has been received, thereby indicating that a total of seven impulses has been transmitted over the line conductors to select and check the selected apparatus unit, circuits are set up at the dispatcher's office whereby the polarity indication impulse lights the amber lamp individual to the selected apparatus unit and also the green or red lamp of the same unit depending upon the position of the selected apparatus unit. The operation of the select key to initiate the selecting operation extinguishes the associate indicating lamps. For example, if the select key SK—1 is operated, all of the indicating lamps associated therewith are extinguished and are not lighted again until the apparatus unit AU—1 has been selected and the proper check code has been received at the dispatcher's office. Therefore, by means of our improved arrangement, the dispatcher knows by the lighting of the lamps associated with a select key after he has operated it, that the desired unit has been selected and also what position the unit is in. Also at the same time, the indicating lamps are lighted, an operating circuit is completed to a master operate key MOK at the dispatcher's office. This master operate key is a three-positioned switch and is normally in its midposition as shown.

If the selected apparatus unit is open, the dispatcher can then effect the closing thereof by moving the master operate key MOK to its closing position, which causes a single relatively long negative impulse to be transmitted over the line conductors L—1 and L—2 to the remote station. If the selected apparatus unit is closed, the dispatcher can effect the opening thereof by moving the master operate key MOK to its tripping position, which causes a single relatively long positive impulse to be transmitted over the line conductors L—1 and L—2. The operation of the key MOK also extinguishes the associate lamps which were lighted. At the remote station, the relatively long operating impulse, if it is a negative impulse, effects the energization of the closing coil of the selected apparatus unit, and if it is a positive impulse, effects the energization of the trip coil of the selected apparatus unit. After the termination of the operating impulse, an indicating impulse of a polarity corresponding to the new position of the selected apparatus unit is transmitted over the line conductors L—1 and L—2 to the dispatcher's office. This indication impulse operates the indicating lamps individual to the selected apparatus unit so that they are lighted again to indicate the new position of the selected apparatus unit. By alternately moving the master operate key MOK to its trip and closed positions, the dispatcher can open and close the selected apparatus unit as many times as he desires.

In order to release a selection and restore the apparatus to normal, the dispatcher merely has to restore the operated select key to its normal position. This effects the completion of an energizing circuit for a release relay D at the dispatcher's office which in turn effects the movement of switches IS and IR so that first the switch IS and then the switch IR is restored to its normal position. While the switch IS is moving through its positions 20 to 23, inclusive, a single short reset impulse is transmitted over the line conductors L—1 and L—2 to the remote station. This short impulse effects at the remote station the energization of a release relay D' which in turn causes the switches I'R' and I'S' to be restored to their normal positions. When both of the switches I'R' and I'S' have been reset, the reset relay D' at the remote station is de-energized and a negative impulse is transmitted over the line conductors L—1 and L—2 to the dispatcher's office. This negative impulse effects the de-energization of the reset relay D at the dispatcher's office, which then effects the completion of an energizing circuit for the start lamp STL if all of the apparatus has been restored to normal.

When the system is at rest and one of the apparatus units at the remote station changes its position, the apparatus operates to change the indicating lamps individual to the operated apparatus unit so as to indicate the new position thereof. Each apparatus unit, such as AU—1, has associated therewith an auxiliary indication relay, such as IA—1, which is normally energized and which becomes de-energized when the apparatus unit changes its position. The de-energization of the auxiliary indication relay effects the operation of the code sender I'S' at the remote station so that it transmits over the line conductors L—1 and L—2 the selection code individual to the operated apparatus unit. At the dispatcher's office this code operates the receiver switch IR so that it selects the group of indicating lamps individual to the operated apparatus unit. The operation of the switch IR also puts out the start lamp STL and effects the operation of a suitable alarm ALM, such as a bell, and also lights a pilot lamp PL to notify the dispatcher that an apparatus unit has changed its position.

After the receiver switch IR has been operated by the impulses transmitted from the remote station, the code sender IS operates to transmit back to the remote station a series of impulses, the number of which depends upon the position of the receiver IR. This series of impulses designated as the check code effects the operation of the receiver I'R' at the remote station. If the total number of impulses transmitted over the line conductors L—1 and L—2 equals 7, the switches I'R' and I'S' at the remote station will then be in the proper position to effect the energization of the de-energized auxiliary indication relay associated with the operated apparatus unit and also to effect the transmission from the remote station to the dispatcher's office of an indication impulse of a polarity corresponding to the new position of the operated apparatus unit. At the dispatcher's office, this indication impulse effects the operation of the selected group of indicating lamps so that they indicate the new position of the operated apparatus unit. The reset relay D at the dispatcher's office is then energized to effect the release of the apparatus at the dispatcher's office and the remote station in the same manner as when it is energized in response to the restoration of a select key to its normal position by the dispatcher.

A detailed description of the operation of the embodiment of our invention shown in the drawings will now be given. When the equipment is not in use, each of the switches IR, IS, I'R', and I'S' is in its normal or zero position, and each group of lamps is lighted to indicate the position of the corresponding apparatus unit. For the purpose of this description, it will be assumed that each apparatus unit is in its open position so that its associate green lamp is lighted. With the apparatus at the dispatcher's office in its normal position, the relays NR, NS, and PNL are energized, and since it is assumed that all of the green lamps are lighted, the indication relays I—1, I—3, I—5, I—7, and I—9 are energized. The circuit of the relay NS includes the wiper and normal contact of bank IS—1 and conductor 100. The circuit of relay NR includes the wiper and normal contact of the bank IR—4 and conductor 101. The circuit of relay PNL includes the contacts g of relay N, contacts g of relay P, and conductor 102. The relay NS, when energized, completes a circuit for the start lamp STL through contacts d of relay D, conductor 103, contacts c of relay NS, conductor 200, contacts d of relay PR, and conductor 201. When the start lamp STL is lighted, it indicates to the dispatcher that the supervisory equipment is in its reset or normal position.

The indication relay I—1 is held energized by a holding circuit which includes the contacts b of the select key SK—1, conductor 104, contacts b of relay I—2, contacts c and winding of relay I—1. Through the contacts a of relay I—1 and conductor 203, a circuit is completed for the green lamp G—1. The indication relay I—3 is held energized by a holding circuit which includes the contacts b of select key SK—2, conductor 105, contacts b of relay I—4, contacts c and winding of relay I—3. Through the contacts a of relay I—3 and conductor 204, a circuit is completed for the green lamp G—2. The indication relay I—5 is held energized by a holding circuit which includes the contacts b of select key SK—3, conductor 106, contacts b of relay I—6, contacts c and winding of relay I—5. Through contacts a of relay I—5 and conductor 205, a circuit is completed for the green lamp G—3. The indication relay I—7 is held energized by a holding circuit which includes the contacts b of select key SK—4, conductor 107, contacts b of relay I—8, contacts c and winding of relay I—7. Through contacts a of relay I—7 and conductor 206, a circuit is completed for the green lamp G—4. The indication relay I—9 is held energized by a holding circuit which includes the contacts b of select key SK—5, conductor 108, contacts b of relay I—10, contacts c and winding of relay I—9. Through contacts a of relay I—9 and conductor 207, a circuit is completed through the green lamp G—5.

When the apparatus at the remote station is in its normal position, the relays N'R' and N'S' are in their normal positions. The circuit of the relay N'R' includes conductor 339 and the wiper and normal contact of bank I'R'—4. The circuit of the relay N'S' includes conductor 338 and the wiper and normal contact of bank I'S'—4.

At the remote station, the auxiliary indication relays IA—1, IA—2, IA—3, IA—4, and IA—5 are also energized. The holding circuit of the relay IA—1 includes the contacts d of the apparatus unit AU—1, conductor 400, and the contacts a and lower winding of relay IA—1. The holding circuit of the relay IA—2 includes the contacts d of an aparatus unit AU—2, conductor 401, contacts a and lower winding of relay IA—2. The holding circuit of relay IA—3 includes the contacts d of apparatus unit AU—3, conductor 402, contacts a and lower winding of relay IA—3. The holding circuit of relay IA—4 includes the contacts d of apparatus unit AU—4, conductor 403, contacts a and lower winding of relay IA—4. The holding circuit of relay IA—5 includes the contacts d of apparatus unit AU—5, conductor 404, contacts a and lower winding of relay IA—5.

It will now be assumed that the dispatcher wants to select and operate the apparatus unit AU—1. After first observing that the start lamp STL is lighted, the dispatcher operates the select key SK—1 from the position shown in the drawings to its other position and then moves the disagreement key DK—1 to its other position. The opening of the contacts b of the select key SK—1 opens the above traced holding circuit for the relay I—1, which in turn, by opening its contacts a, interrupts the circuit of the green lamp G—1. The closing of the contacts a of the select key SK—1 completes an energizing circuit for the relay T through contacts f of relay D, conductor 109, contacts f of relay PR, conductor 208, contacts a of select key SK—1, conductor 110, contacts d of operating magnet MS, and conductor 209. By closing its contacts a, relay T completes an energizing circuit for the motor magnet MS through conductor 111, contacts a of relay T, conductor 210, and contacts d of relay LP. Motor magnet MS, by opening its contacts d, interrupts the above-traced circuit for relay T, which in turn, by opening its contacts a, deenergizes the motor magnet MS. The code sender IS is thereby operated so that it moves to position 1. The stepping operation of the code sender IS is thus successively repeated until the wiper of the bank IS—3 reaches position 7, where a holding circuit is completed for the motor magnet MS. This circuit includes the conductor 111, wiper and contact 7 of bank IS—3, conductor 112, contacts e of select key SK—1, conductor 113, resistor 114, conductor 109, and contacts f of relay D. Since the motor magnet MS is held energized over this holding circuit, further movement of the sender IS is prevented. When the wiper associated with bank IS—2 engages with its stationary contacts 4 and 6 during this movement of the switch IS, a circuit is completed for the relay P. This circuit includes the conductor 212, wiper and contact 4 of bank IS—2 when switch IS is in position 4, wiper and contact 6 of bank IS—2 when switch IS is in position 6, conductor 110, contacts a of select key SK—1, conductor 208, contacts f of relay PR, conductor 109, and contacts f of relay D. Each time the relay P is energized, its contacts a and c connect the line conductors L—1 and L—2 to a suitable source of direct current so that a positive impulse is transmitted over the line conductors.

At the remote station, each positive impulse flows through the winding of the polarized line relay L' which is connected across the line conductors L—1, L—2 through contacts b of the relay N' and contacts b of the relay P'. Each positive impulse causes the relay L' to close its contacts p so that a circuit is completed for relay L'P'. By closing its contacts a, relay L'P' completes a holding circuit for itself through conductor 301, contacts b of relay S'—1, conductor 302, contacts b of operating magnet M'R', conductor 303, and contacts b of relay D'. By closing its contacts e, relay L'P' completes an energizing circuit for the motor magnet M'R' through conductor 304, contacts b of relay C'—1, conductor 305, contacts e of relay L'P', conductor 306, and contacts f of relay D'. Motor magnet M'R', by opening its contacts b, interrupts the above-traced holding circuit for the relay L'P', so that this relay becomes de-energized after the relay L'P' opens its contacts a at the termination of the positive impulse over the line conductors. By opening its contacts e, relay L'P' interrupts the energizing circuit for the motor magnet M'R' so that this magnet becomes de-energized and steps the receiver switch I'R' from its normal position to its position 1. The same sequence is repeated when the second positive impulse is received at the remote station and the receiver I'R' is moved from its position 1 to its position 2, where it stops, due to the fact that under the conditions assumed, only a code of two positive impulses is transmitted from the dispatcher's office to the remote station.

A predetermined time after the second positive impulse is received at the remote station, the slow-to-operate relay S'—1 is energized over a circuit which includes the wiper and contact 2 of bank I'R'—6, wiper and contact 2 of bank I'R'—5, conductor 411, resistance 412, conductor 406, and contacts f of relay L'P'. While the selecting impulses are being transmitted to the remote station, the receiver I'R' does not remain in one position long enough for the slow-to-operate relay S'—1 to operate. By closing its contacts a, relay S'—1 completes an energizing circuit for the relay T'. This circuit includes the contacts b of motor magnet M'S', conductor 425, contacts a of relay S'—1, conductor 306, and contacts f of relay D'. By closing its contacts a, relay T' completes an energizing circuit for the motor magnet M'S' through conductor 406, and contacts f of relay L'P'. Motor magnet M'S', by opening its contacts b, interrupts the energizing circuit of the relay T', which in turn, by opening its contacts a, interrupts the energizing circuit for the motor magnet M'S', which, when de-energized, moves the code sender I'S' to its position 1. This notching operation is identical to that of the dispatcher's code sender. Thus the substation code sender I'S' steps from position to position until the wiper associated with bank I'S'—3 reaches position 21 where a holding circuit is completed for motor magnet M'S' through wiper and contact 21 of bank I'S'—3, wiper and contact 2 of bank I'R'—3, conductor 409, and contacts d of relay D'. As the wiper I'S'—2 engages with each of the contacts 12, 14, 16, 18, and 20, a circuit is completed for the relay P'. This circuit includes the contacts f of the relay D', conductor 306, and conductor 407. By closing its contacts a and c, relay P' transmits a positive impulse over the line conductors L—1 and L—2 to the dispatcher's office. Each positive impulse operates the line relay L at the dispatcher's office so that it closes its contacts p. The operating winding of the relay L is connected across the line conductors L—1 and L—2 by contacts b of the relay N, and contacts b of the relay P. By closing its contacts p, relay L completes an energizing circuit for the relay LP. Thus, the relay LP is operated five times in response to the check code sent over the line conductors L—1 and L—2 from the remote station. Each time the relay LP closes its contacts a, it completes a locking circuit for itself through the contacts b of the operating magnet MR, conductor 214, contacts b of relay C—1, conductor 216, contacts d of relay C—1, conductor 103, and contacts d of relay D. By closing its contacts e, relay LP completes an energizing circuit for the operating magnet MR through conductor 216, conductors d of relay C—1, conductor 103, and contacts d of relay D. By opening its contacts b, the motor magnet MR interrupts the above-traced locking circuit for itself so that it in turn opens its contacts e and effects the de-energization of the motor magnet MR. Receiver switch IR is thus stepped to position 5 in response to the five positive impulses constituting the check code. A predetermined time after the switch IR reaches position 5, slow-to-operate check relay C—1 is energized through a circuit which includes conductor 219, wiper and contact 5 of bank IR—2, wiper and contact 7 of bank IS—2, conductor 110, contacts a of select key SK—1, conductor 208, contacts f of relay PR, conductor 109, and contacts f of relay D. It will be noted that it is possible for relay C—1 to be energized only in case the sum of the code impulses sent to select the apparatus unit AU—1 and of the impulses constituting the check code is 7. Therefore, the operation of the check relay C—1 is an indication that the desired apparatus unit in the remote station has been selected.

Also, when the switch IR stops in position 5, slow-to-operate relay S—1 picks up as its circuit remains completed through contacts d of relay LP and contacts a of relay C—1 in parallel, conductor 210, resistance 211, conductor 213, wiper and contact 5 of bank IR—5, winding of relay S—1 and wiper and contact 5 of bank IR—6.

At the remote station a predetermined time after the code sender I'S' stops in position 21, the slow-to-operate relay C'—1 operates. The energizing circuit of this relay C'—1 includes the conductors 308, wiper and contact 2 of bank I'R'—2, wiper and contact 21 of bank I'S'—2, conductor 306, and contacts f of relay D'. By closing its contacts g, relay C'—1 completes a circuit for relay I'T' through conductor 309, contacts b of relay I'C', conductor 310, contacts g of relay C'—1, conductor 311, contacts d of relay L'N', conductor 329, contacts f of relay P'N', conductor 312, wiper and contact 21 of bank I'S'—1, conductor 406, and contacts d of apparatus unit AU—1. By closing its contacts a, relay I'T' completes a holding circuit for itself between conductors 311 and 312. By closing its contacts g, relay I'T' completes a circuit through the winding of relay P', conductor 407, contacts g of relay I'T', conductor 313, contacts b of relay P'N', conductor 314, contacts d of relay C'—2, conductor 306, and contacts f of relay D'. Relay P' is thereby energized to cause a positive indication impulse to be transmitted over the line conductors L—1 and L—2. The indication impulse is positive because the apparatus unit AU—1 is open. If the apparatus unit had been closed, this indication impulse would have been negative.

By closing its contacts e, relay P' completes a circuit through the winding of relay P'N', conductor 316, contacts e of relay P', conductor 317, contacts e of relay C'—1, contacts e of relay I'T', conductor 314, contacts d of relay C'—2, conductor 306, and contacts f of relay D'. After being energized for a predetermined time, the slow-to-operate relay P'N' opens its contacts b in the above-traced circuit for the relay P' and effects the de-energization of this relay so as to remove the indication impulse from the line conductors L—1 and L—2. By closing its contacts c, relay P'N' connects together the conductors 316 and 317 so that a holding circuit is completed for the winding of relay P'N' which is independent of the contacts e of relay P'. Consequently the relay P'N' remains energized after the relay P' is de-energized to remove the indication impulse.

At the dispatcher's office, the indication impulse operates the line relay L so that it closes its contacts p and effects in the manner above-described the energization of the relay LP. Since the relay C—1 is now energized, the closing of the contacts c of relay LP completes the circuit for the relay IT through conductor 220, contacts c of relay LP, conductor 221, contacts e of relay C—1, conductor 222, contacts b of relay NS, conductor 223, and contacts e of relay PNL. By closing its contacts a, relay IT completes a locking circuit for itself from conductor 220, through contacts b of relay IC to conductor 222. By closing its contacts e, relay IT completes the circuit for amber lamp A—1 through conductor 121, wiper and contact 5 of bank IR—1, conductor 122, contacts e of relay IT, conductor 109, and contacts f of relay D. The lighting of the amber lamp A—1 informs the operator that the apparatus unit AU—1 has been selected.

By closing its contacts g, relay IT completes a circuit for the relay I—1 through conductor 225, wiper and contact 7 of bank IS—5, conductor 124, contacts g of relay IT, conductor 103, and contacts d of relay D. By closing its contacts a, relay I—I completes the above-traced circuit for the green lamp G—I. Since the disagreement key DK—I is in its left-hand position, which is the close position of the key, a circuit is also completed from conductor 203 to the white lamp W—I. The lighting of the lamp G—I tells the operator that the selected apparatus unit AU—I is in its open position and the lighting of the white lamp W—I informs him that the disagreement key is in the closed position.

By closing its contacts e, relay IT also completes an energizing circuit for relay C—2 through conductor 228, contacts f of relay LN, contacts f of relay LP, conductor 122, contacts e of relay IT, conductor 109, and contacts f of relay D.

After the lamps A—I and G—I are lighted, the dispatcher operates the master operate key MOK to its lower position, which is the close position, and after leaving it there for a short time, restores the key to its normal position. When the key MOK is moved to its close position, a circuit is completed for the relay N through contacts f of relay P, conductor 230, contacts a of relay MOK, conductor 231, contacts a of relay C—2, conductor 232, contacts b of relay C—3, conductor 229, and contacts c of relay C—I. Since this circuit can be completed only when relay C—2 is energized, and C—2 can be energized only when both of the relays LP and LN are de-energized, an operating impulse can be transmitted only when no indication is being received at the dispatcher's office. By closing its contacts a and c, relay N connects the line conductors L—I and L—2 to a suitable source of direct current so that a negative control impulse is transmitted over the line conductors to the remote station. By closing its contacts e, relay N completes a locking circuit for itself around the contacts a of the master operate key so that the relay may remain energized after the contacts a of the key MOK are opened. By opening its contacts g, relay N interrupts the circuit of the relay PNL, which in turn, by opening its contacts e, interrupts the locking circuit for relay IT. By opening its contacts g, relay IT de-energizes relay I—I, which becomes de-energized. By opening its contacts a, the relay I—I puts out again the green indicating lamp G—I and the white lamp W—I. The opening of the contacts e of relay IT, however, does not effect the de-energization of the relay C—2 until the master operate key MOK is restored to its normal position because when this key is in its closed position, a circuit is completed for the winding of relay C—2 through the conductor 228, contacts f of relay LN, contacts f of relay LP, conductor 122, contacts c of relay C—2, conductor 233, and contacts c of key MOK. However, as soon as the key MOK is restored to its normal position, relay C—2 becomes de-energized and by opening its contacts a after a time delay, interrupts the energizing circuit for the relay N to disconnect the operating impulse from the line conductors.

At the remote station, the negative operating impulse causes the line relay L' to close its contacts n so that a circuit is completed for the relay L'N'. By closing its contacts a, relay L'N' completes an energizing circuit for slow-to-operate relay C'—2 through conductor 321, contacts c of relay C'—I, conductor 306, and contacts f of relay D'. The operating impulse must be of sufficient length to allow this slow-to-operate relay C'—2 to pick up and close its contacts. By making the termination of the operating impulse depend upon the dropping out of the time relay C—2 at the dispatcher's office, this result is obtained. Therefore, it is impossible for the dispatcher to send a relatively short reset impulse by momentarily closing the operating key MOK. By closing its contacts a, relay C'—2 completes an energizing circuit for relay C'—3 through conductor 323, conductor 306 and contacts f of relay D'. By opening its contacts d, relay C'—2 interrupts the holding circuit of the relay P'N'. As soon as this relay P'N' closes its contacts d, a locking circuit is completed for the relay C'—3 from conductor 306 to conductor 323 through contacts e of relay C'—3.

By closing its contacts c, relay C'—2 completes a circuit through conductor 325, contacts c of relay L'N', conductor 326, contacts a of relay I'T', conductor 327, wiper and contact 21 of bank I'S'—6, conductor 408, closing coil CC—I of apparatus unit AU—I, and contacts b of apparatus unit AU—I. The energization of the closing coil CC—I closes the apparatus unit AU—I so that it opens its auxiliary contacts b and d and closes its contacts a and c. The opening of the contacts d and the closing of the contacts c of the apparatus unit AU—I reverses the potential applied to the conductor 400 so that the lower winding of the relay IA—I is short-circuited and the upper winding is energized. Since the two windings of the relay IA—I are oppositely wound, the energization of the upper winding reverses the magnetic flux in the relay so that the relay drops out and opens its locking circuit through its contacts a. The same reversal of potential produced by the opening of the contacts d and the closing of the contacts c of the apparatus unit AU—I effects the de-energization of relay I'T' and the energization of relay I'C'. The circuit of relay I'C' includes the contacts c of the apparatus unit AU—I, conductor 400, wiper and contact 21 of I'S'—I, conductor 312, contacts f of relay P'N', conductor 329, contacts b of relay I'T', winding of relay I'C', conductor 321, contacts c of relay C'—I, conductor 306, and contacts f of relay D'. By closing its contacts c, relay I'C' completes a locking circuit for itself around the contacts f of the relay P'N'.

The relay IA—I is again energized by a circuit through the contacts c of apparatus unit AU—I, conductor 400, wiper and contact 21 of bank I'S'—I, conductor 312, contacts i of relay C'—I, conductor 330, contacts a of relay C'—3, conductor 331, contacts h of relay D', conductor 332, wiper and contact 2 of bank I'R'—I, and upper winding of relay IA—I. By closing its contacts a, relay IA—I completes a locking circuit for its upper winding through conductor 400 and contacts c of apparatus unit AU—I.

If the control impulse has been taken off the line conductors L—I and L—2 by this time so that the relay C'—2 has become de-energized, the relay I'C', by closing its contacts c, completes an energizing circuit for the relay N' to transmit a negative indication impulse over the line conductors L—I and L—2. This circuit for the relay N' includes the conductor 340, contacts e of relay I'C', conductor 313, contacts b of relay P'N', conductor 314, contacts d of relay C'—2, conductor 306, and contacts f of relay D'. By closing its contacts e, relay N' completes an energizing circuit for relay P'N' through conductor 316, contacts e of relay N', conductor 317, contacts e of relay C'—I, contacts a of relay I'C', conductor 314, contacts d of relay C'—2, conductor 306, and contacts f of relay D'. Relay P'N', by closing its contacts c, completes a locking circuit for itself around the contacts e of relay N' and by opening its contacts b, interrupts the circuit of relay N' to remove the indication impulse from the line conductors L—1 and L—2. Also, by opening its contacts d, relay P'N' interrupts the locking circuit of the relay C'—3, which becomes de-energized and at its contacts a opens the original energizing circuit for the upper winding of relay IA—1.

At the dispatcher's office, the negative indication impulse operates the line relay L so that it closes its contacts n to complete an energizing circuit for the relay LN. By closing its contacts a, relay LN completes a circuit through the contacts e of relay PNL, conductor 223, contacts b of relay NS, conductor 222, contacts e of relay C—1, conductor 221, contacts a relay LN, and winding of relay IC. By closing its contacts a, relay IC completes a locking circuit for itself through contacts b of relay IT. By closing its contacts e, relay IC completes an energizing circuit for C—2 through conductor 228, contacts f of relay LN, contacts f of relay LP, conductor 122, contacts e of relay IC, conductor 109, and contacts f of relay D. By closing its contacts g, relay IC completes an energizing circuit for indication relay I—2 through conductor 235, wiper and contact 7 of bank IS—6, conductor 126, contacts g of relay IC, conductor 103, and contacts d of relay D'. By closing its contacts a, indication relay I—2 completes through conductor 237, a circuit for red lamp R—1. Since the disagreement key is in its close position, the white lamp W—1 is not lighted at this time.

The apparatus unit AU—1 may be opened again, if desired, by moving the master operate key MOK to its upper position, which is the trip position, and after leaving it there for a short time, restoring the key to its normal position. When the key MOK is in its trip position, a circuit is completed for the relay P through conductor 212, contacts f of relay N, conductor 239, contacts b of key MOK, conductor 231, contacts a of relay C—2, conductor 232, contacts b of relay C—3, conductor 229, and contacts c of relay C—1. Relay P causes a positive operating impulse to be transmitted over the line conductors to the substation. By closing its contacts e, relay P completes a locking circuit for itself around the contacts b of the master operate key MOK so that the relay P remains energized after the contacts of the key MOK are opened. By opening its contacts g, relay P interrupts the circuit of the relay PNL, which, in turn, by opening its contacts e, interrupts the holding circuit for the relay IC. By opening its contacts g, relay IC de-energizes the indication relay I—2, which becomes de-energized. By opening its contacts a, the relay I—2 puts out the red lamp R—1. The opening of the contacts e of relay IC, however, does not effect the de-energization of relay C—2, until the master operating key MOK has been restored to its normal position because when the key MOK is in its trip position a locking circuit is maintained for relay C—2 through contacts c of relay C—2 and contacts d of key MOK. When the relay C—2 becomes de-energized after the key MOK is restored to its normal position, its contacts a interrupt the energizing circuit of the relay P to disconnect the operating impulse from the line conductors.

At the remote station, the positive operating impulse causes the line relay L' to close its contacts p so that a circuit is completed for the relay L'P'. By closing its contacts c, relay L'P' completes an energizing circuit for relay C'—2 through conductor 321, contacts c of relay C'—1, conductor 306, and contacts f of relay D'.

The energization of the relay C'—2 completes at its contacts a the energizing circuit for the relay C'—3 and interrupts at its contacts d the holding circuit for the relay P' N', which in turn by closing its contacts d completes a locking circuit for the relay C'—3 in the same manner as above described in connection with the negative control impulse. By closing its contacts e, relay C'—2 completes a circuit through conductor 337, contacts g of relay L'P', conductor 336, wiper and contact 21 of bank I'S'—5, conductor 420, winding of trip coil TC—1 of apparatus unit AU—1, and contacts a of apparatus unit AU—1. The energization of the trip coil TC—1 effects the opening of the apparatus unit AU—1 so that it opens its auxiliary contacts a and c and closes its contacts b and d. The opening of the contacts c and the closing of the contacts b of the apparatus unit AU—1 reverses the potential applied to the conductor 400 so that the upper winding of relay IA—1 is short-circuited and the lower winding is energized. This produces a reversal of flux in the relay so that the relay drops out and opens its locking circuit through its contacts a. The same reversal of potential applied to the conductor 400 causes the relay I'C' to become de-energized and the relay I'T' to become energized. The energizing circuit for relay I'T' includes the contact d of apparatus unit AU—1, conductor 409, wiper and contact 21 of bank I'S'—1, conductor 312, contact f of relay P'N', contacts d of relay L'N', conductor 311, contact g of relay C'—1, conductor 310, contacts b of relay I'C', conductor 309 and winding of relay I'T'. By closing its contacts c, relay I' T' completes a locking circuit for itself around the contacts f of the relay P'N'.

The relay IA—1 is again energized by a circuit which includes the contacts d of apparatus unit AU—1, conductor 400, wiper and contact 21 of bank I'S'—1, conductor 312, contacts i of relay C'—1, conductor 330, contacts a of relay C'—3, conductor 331, contacts h of relay D', conductor 332, wiper and contacts 2 of bank I'R'—1, and lower winding of relay IA—1. By closing its contacts a, relay IA—1 completes a locking circuit for its lower winding through conductor 400 and contacts d of apparatus unit AU—1. When the relay C'—2 becomes de-energized at the termination of the operating impulse, the closing of its contacts d completes an energizing circuit for the relay P' to transmit a positive indication impulse over the line conductors L—1 and L—2. This circuit for the relay P' includes the conductor 407, contacts g of relay I'T', conductor 313, contacts b of relay P'N', conductor 314, contacts d of relay C'—2, conductor 306, and contacts f of relay D'. By closing its contacts e, relay P' completes the energizing circuit for relay P'N' through conductor 316, contacts e of relay P', conductor 317, contacts e of relay C'—1, contacts e of relay I'T', conductor 314, contacts d of relay C'—2, conductor 306, and contacts f of relay D'. Relay P'N', by closing its contacts c, completes the locking circuit for itself and by opening its contacts b, interrupts the circuit of relay P' to remove the indication impulse from the line conductors L—1 and L—2. Also, by opening its contacts d, relay P'N' interrupts the locking circuit of the relay C'—3.

At the dispatcher's office, the positive indication impulse operates the line relay L so that it closes its contacts p to complete an energizing circuit for the relay LP. By closing its contacts a, relay LP completes a circuit for relay IT through conductor 220, contacts c of relay LP, conductor 221, contacts e of relay C—1, conductor 222, contacts b of relay NS, conductor 223, and contacts e of relay PNL. By closing its contacts g, relay IT completes an energizing circuit for indication relay I—1 through conductor 225, wiper and contact 7 of bank IS—5, conductor 124, contacts g of relay IT, conductor 103, and contacts d of relay D. By closing its contacts a, indication relay I—1 completes through conductor 203 a circuit for the green lamp G—1. The lighting of this lamp informs the operator that the apparatus unit AU—1 is now in its open position.

The selected apparatus unit AU—1 may be operated as many times as desired without releasing the selection by moving the master operate key MOK to either its trip or closed position, and each time the associate group of lamps is operated to show the new position of the apparatus unit.

Whenever it is desired to release a selection and restore the apparatus to its normal condition, the dispatcher merely moves whichever select key has been operated, back to its normal position. In the case assumed, the dispatcher merely moves the select key SK—1 to its normal position.

For the purpose of this description, it will be assumed that the dispatcher moves the select key SK—1 to its normal position after he has closed the apparatus unit AU—1. By opening the contacts e of the select key SK—1, the heretofore traced holding circuit for the motor magnet MS is interrupted so that this motor magnet becomes deenergized. By closing the contacts b of the select key SK—1, a holding circuit is completed for the indication relay I—2 through conductor 104, contacts b of relay I—1, and contacts c of relay I—2. The closing of the contacts d of the relay SK—1 completes an energizing circuit for the release relay D through conductor 134, contacts b of relay NR, d of relay NS and d of relay LN in parallel, conductor 135, contacts a of relay S—1, conductor 136, contacts d of relay C—3, conductor 137, contacts d of select-key SK—5, contacts d of select key SK—4, contacts d of select key SK—3, contacts d of select key SK—2, and contacts d of select key SK—1. By closing its contacts e, relay D completes a locking circuit for itself through the parallel connected contacts b of relay NR, d of relay NS and d of relay LN. By opening its contacts f, relay D prevents flashing of the amber lamps while the selector IR is resetting. By opening its contacts d, relay D prevents the energization of the start lamp STL and any other indication relay while the switch IS is resetting.

Contacts a of relay D, in conjunction with the interrupter contacts b of motor relay magnet MS and wiper and contacts of bank IS—4 provide a self-interrupting stepping circuit for the switch IS. Contacts c of relay D, contacts d of motor magnet MR and the wiper and contacts of bank IR—4 provide a similar self-interrupting stepping circuit for switch IR. Thus, both of the switches IR and IS are notched around to their zero position by means of these stepping circuits. When the switch IR reaches its normal position, the relay NR is energized through the wiper and normal contact of bank IR—4, and when the switch IS reaches its normal position, the relay NS is energized through the wiper and normal contact of bank IS—1. During the resetting operation of the switch IS, it remains in its position 18 until the switch IR has reached its normal position and relay NR has closed its contacts a, which, in position 18 of switch IS, are connected in series in the stepping circuit for magnet MS. Therefore, the switch IR always reaches its normal position before the switch IS does. Consequently, the relay NR opens its contacts d in the circuit of the relay PR before the relay NS becomes energized and closes its contacts a. The purpose of this sequence of operation is to prevent the relay PR from operating and effecting the lighting of the pilot lamp PL and the ringing of the alarm ALM during the resetting operation. During the resetting operation, the relay IC remains energized until the relay NS opens its contacts b in response to the switch IS reaching its normal position.

While the wiper of bank IS—1 is passing over contacts 20 to 23, inclusive, a circuit is maintained completed to energize, for a short time interval, the relay N. This circuit includes contacts f of relay P, conductor 230, contacts c of relay IC, conductor 246, contacts a of key PLK, conductor 247, and wiper and contacts 20 to 23, inclusive, of bank IS—1. The wiper associated with bank IS—1 is so shaped that when in motion it bridges two adjacent contacts. The energization of the relay N causes a short resetting impulse of negative polarity to be transmitted over the line conductors L—1 and L—2 to the remote station. The polarity of this reset impulse depends upon the position of the selected apparatus unit as it depends upon wether relay IT or IC is energized. If the apparatus unit had been in its open position, the relay IT would have been energized so that its contacts c would have effected the energization of relay P to transmit a positive reset impulse.

At the substation this short reset impulse effects the energization of the relays L'N' and P'N in the same manner as a negative operating impulse. This reset impulse, however, is too short to permit the slow-to-operate relay C'—2 to pick up. Therefore, at the termination of the reset impulse, the de-energization of the relay L'N' completes an energizing circuit for the release relay D'. This circuit includes the contacts b of relay C'—2, contacts b of relay N'S', and contacts b of relay N'R' in parallel, contacts e of relay L'N', and winding of relay L'N'. The reset relay D' is thereby energized in series with the relay L'N'.

By opening its contacts d, relay D' interrupts the holding circuit for the motor magnet M'S' and by opening its contacts f, the relay D' de-energizes the relays PN' and C'—1 and prevents any energization of the relays T', P', or N' while the remote station apparatus is resetting. The opening of the contacts h of relay D' prevents any of the indication relays at the substation from becoming energized during the resetting operation. The closing of the contacts e of the relay D' completes through conductor 427, the contacts d of the motor magnet M'S', conductor 334, contacts e of relay D' and the wiper and contacts of bank I'S'—4 an interrupting circuit for the motor magnet M'S' which causes the switch I'S' to return to its normal position. By closing its contacts c, relay D' completes through conductor 304, contacts d of motor magnet M'R', contacts c of relay D', and the wiper and contacts of bank I'R'—4 a self-interrupting circuit for motor magnet M'R' so that the switch I'R' is restored to its normal position. When the switch I'S' reaches its normal position, the energizing circuit for relay N'S' is completed through conductor 338 and the wiper and normal contact of bank I'S'—4. When the switch I'R' reaches its normal position, an energizing circuit is completed for relay N'R' through the conductor 339 and the wiper and normal contact of bank I'R'—4. When both of the relays N'S' and N'R' are energized, the above-traced circuit for the relay D' is opened at the parallel connected contacts $b$ of these relays. By closing its contacts $f$, relay D' completes a circuit for relay N' through conductor 306, contacts $d$ of relay C'—2, conductor 314, contacts $b$ of relay P'N', conductor 313, contacts $a$ of relay N'S', conductor 341, contacts $a$ of relay N'R', conductor 340, and winding of relay N'. The energization of the relay N' causes a negative resetting impulse to be transmitted over the line conductors L—1 and L—2 to the dispatcher's office. By closing its contacts $e$, relay N' completes an energizing circuit for relay P'N' through contacts $f$ of relay D', conductor 306, contacts $d$ of relay C'—2, conductor 314, contacts $c$ of relay N'R', conductor 342, contacts $c$ of relay N'S', conductor 317, contacts $e$ of relay N', conductor 316, and winding of relay P'N'. By opening its contacts $b$, relay P'N' opens the above-traced circuit of relay N' to remove the negative reset impulse from the line conductors L—1 and L—2.

At the dispatcher's office the negative reset impulse effects, in the manner above described, the energization of the relay LN, which, by opening its contacts $d$, interrupts the locking circuit for the relay D. By closing its contacts $d$, relay D completes the above-traced circuit for the start lamp STL. The lighting of this lamp informs the dispatcher that all of the apparatus has returned to its normal position.

If the dispatcher returns an operated select key to normal after the sender IS has stopped but before the selecting operation has been completed, the selecting operation is completed before the reset impulse is transmitted. This result is accomplished by means of relay B, which is energized through wiper and contacts 7, 9, 11, 13, or 15 of bank IS—1, depending upon which select key has been operated, conductor 262, contacts $d$ of relay T, contacts $c$ of relay PNL, and winding of relay B. By closing its contacts $a$, relay B completes a locking circuit for itself from conductor 103 and by closing its contacts $c$, it completes a holding circuit for motor magnet, which is maintained until reset relay D is energized in the normal manner and opens its contacts $d$ in the holding circuit of relay B.

In case the holding circuit of the motor magnet MS is interrupted in some other manner than by restoring the operated select key to its normal position, the de-energization of the magnet MS moves the switch IS to its next position and also completes the circuit of relay T so as to re-establish the notching circuit for magnet MS to move this switch to position 16. In this position 16, a circuit is completed for reset relay D through conductor 134, contacts $d$ of relay NS, conductor 135, and wiper and contacts 16 of bank IS—1. The relay D then effects the resulting operation of all of the apparatus in the normal manner.

If upon restoring a select key to its normal position, the start light fails to light, it indicates that for some reason all of the equipment has not properly reset. If the circuits are in an operative condition, the dispatcher may initiate another resetting operation of the equipment by operating the emergency reset key ERK to its lower position and releasing it. When the key ERK is in its lower position, a circuit is completed through its contacts $a$ and conductor 134 for the reset relay D. By closing its contacts $a$, relay D completes the notching circuit for motor magnet MS through contacts $c$ of key ERK, which connects contact 1 of bank IS—4 with contacts 1—15, inclusive, 17, and 19—23, inclusive, of the same bank. This notching circuit for magnet MS causes the switch IS to move to position 16, in which the notching circuit is opened at the contacts $b$ of key ERK. When this key is released, the notching circuit for magnet MS is again completed so that the switch IS is restored to its zero position. As switch IS is moving through positions 20 to 23, inclusive, relay N is energized in the manner heretofore described to transmit to the remote station a short negative impulse which effects the operation of the reset relay D' thereat to effect the resetting of the apparatus at both stations in the normal manner.

In order to describe how the system operates, to indicate to the dispatcher that an apparatus unit at the remote station has operated automatically, it will be assumed that the apparatus unit AU—3 moves from its closed to its open position while the supervisory control system is in its normal condition. Under the conditions assumed, the relay I—6 is energized and the red lamp R—3 is lighted at the time the apparatus unit changes its position. The circuit of relay I—6 includes its contact $c$, contacts $b$ of relay I—5, conductor 106 and contacts $b$ of select key SK—3. By opening its contacts $c$ and closing its contacts $d$, the apparatus unit AU—3 reverses the potential applied to the conductor 402 so that the magnetic flux in the relay IA—3 is reversed. This causes the relay IA—3 to open its contacts $a$ and close its contacts $b$ and $d$. By closing its contacts $b$, relay IA—3 completes an energizing circuit for relay T' through contacts $b$ of relay M'S', conductor 425, contacts $b$ of relay IA—3, conductor 426, contacts $e$ of relay N'R', conductor 306, and contacts $f$ of relay D'. By closing its contacts $a$, relay T' completes an energizing circuit for the motor magnet M'S' from conductor 427 through conductor 406 and contacts $f$ of relay L'P'. By opening its contacts $b$, the motor magnet M'S' interrupts the above-traced circuit for relay T', which in turn, by opening its contacts $a$, deenergizes the motor magnet M'S' so as to move the switch I'S' to position 1. The stepping operation of the sender switch I'S' is thus successively repeated until the wiper of bank I'S'—3 reaches position 17, where a holding circuit is completed for the motor magnet M'S'. This circuit includes conductor 427, wiper and contact 17 of bank I'S'—3, conductor 428, contacts $d$ of relay IA—3, conductor 429, contacts $c$ of relay C'—3, which is energized at this time, as will be described hereinafter, conductor 344, contacts $d$ of relay C'—1, conductor 409, and contacts $d$ of relay D'. Since the motor magnet M'S' is held energized through this holding circuit, further movement of the switch I'S' is prevented. After the switch I'S' reaches position 11, the circuit of relay N'S' through the wiper and contacts of bank I'S'—4 is interrupted. By closing its contacts $d$, relay N'S' completes an energizing circuit for relay C'—3 through conductor 323, contacts $d$ of relay N'S', conductor 346, contacts $g$ of relay N'R', conductor 306, and contacts $f$ of relay D'. Relay C'—3 is therefore energized in order to complete the heretofore traced holding circuit for motor magnet M'S' when the switch I'S' reaches its position 17.

While the wiper of bank I'S'—2 is in engagement with its contacts 12, 14, and 16, a circuit is completed through contacts f of relay D', conductor 306, and conductor 407 for the relay P'. Thus, a code of three positive impulses is transmitted over the line conductors L—1 and L—2 to the dispatcher's office.

At the dispatcher's office, these three positive impulses effect, in the manner above described, the energization of the relay LP and motor magnet MR. Therefore, the switch IR is moved to its position 3. As soon as the wiper of bank IR—4 leaves its normal position, relay NR becomes de-energized. By closing its contacts d, relay NR completes through conductor 250, contacts a of relay NS, and conductor 249 an energizing circuit for slow-to-operate relay PR, and also for the alarm ALM through contacts b of relay PR, which contacts are opened after the relay PR has been energized for a short time interval. The alarm is thereby operated for a short time to notify the dispatcher that an apparatus unit at the remote station has changed its posititon. By closing its contacts c, relay PR effects the lighting of the pilot lamp PL and by opening its contacts d, it extinguishes the start lamp STL. By closing its contacts a, relay PR completes a locking circuit for itself through conductor 247 and contact c of key PLK.

The de-energization of relay NR when the switch IR leaves its normal position also completes an energizing circuit for relay C—3 through conductor 256, contacts e of relay NS, conductor 253, and contacts f of relay NR. By closing its contacts a, relay C—3 completes a locking circuit for itself from conductor 256 through conductor 255, contacts f of relay IT, contacts f of relay IC, conductor 255, contacts a of relay C—3, conductor 103, and contacts d of relay D.

When the switch IR stops in position 3, the slow-to-operate relay S—1 picks up in a manner heretofore described and by closing its contacts c, completes an energizing circuit for relay T through conductor 209, contacts d of motor magnet MS, conductor 110, contacts e of relay C—3, conductor 257, contacts c of relay S—1, conductor 109, and contacts f of relay D. By closing its contacts a, relay T completes the stepping circuit for motor magnet MS so that the code sender IS moves from its initial position to position 11, where a holding circuit is completed for the motor magnet MS through conductor 111, wiper and contact 11 of bank IS—3, conductor 140, wiper and contacts 3 of bank IR—3, conductor 141, contact c of relay C—3, conductor 113, resistance 114, conductor 109, and contact f of relay D. In positions 4, 6, 8, and 10 of switch IS, a circuit is completed for relay P through conductor 212, wiper and contacts 4, 6, 8, and 10 of bank IS—2, conductor 110, contacts e of relay C—3, conductor 257, contacts c of relay S—1, conductor 109, and contacts f of relay D. Consequently, the relay P is energized four times to transmit a code of four positive check impulses over the line conductors L—1 and L—2 to the substation. These four impulses effect, in the manner above described, the operation of the selector switch I'R' at the remote station to its position 4.

When the switch I'R' stops in position 4, a circuit is completed for slow-to-operate relay C'—1 through conductor 308, wiper and contact 4 of bank I'R'—2, conductor 431, wiper and contact 17 of bank I'S'—2, conductor 306, and contacts f of relay D'. By closing its contacts i, relay C'—1 completes an energizing circuit for the lower winding of relay IA—3 through conductor 432, wiper and contact 4 of bank I'R'—1, conductor 332, contacts h of relay D', conductor 331, contacts a of relay C'—3, conductor 330, contacts i of relay C'—1, conductor 312, wiper and contact 17 of bank I'S'—1, conductor 402, and contacts d of apparatus unit AU—3. By closing its contacts a, relay IA—3 completes a locking circuit for itself through conductor 402 and contacts d of apparatus unit AU—3. At the same time, a circuit is completed for relay I'T' through conductor 309, contacts b of relay I'C', conductor 310, contacts g of relay C'—1, conductor 311, contacts d of relay L'N', conductor 329, contacts f of relay P'N', conductor 312, wiper and contact 17 of bank I'S'—1, conductor 402, and contacts d of apparatus unit AU—3. By closing its contacts g, relay I'T' completes, in a manner heretofore described, an energizing circuit for the relay P' which causes a positive indication impulse to be transmitted over the line conductors L—1 and L—2 to the dispatcher's office. The relay P' also effects the energization of the slow-to-operate relay P'N', which in turn effects the de-energization of the relay P' to remove the indication impulse from the line conductors.

At the dispatcher's office, the positive indication impulse effects, in the manner above described, an energization of the relay LP, which, by closing its contacts c, completes the heretofore traced circuit for relay IT. By closing its contacts g, relay IT completes an energizing circuit for relay I—5 through conductor 260, wiper and contact 11 of bank IS—5, conductor 124, contacts g of relay IT, conductor 103, and contacts d of relay D. By opening its contacts b, relay I—5 interrupts the locking circuit of relay I—6 so that it opens its contacts a, and thereby interrupts the circuit of the red lamp R—3, which is completed through these contacts. By closing its contacts a, relay I—5 completes an energizing circuit for the green lamp G—3 through conductor 205 and also the white lamp W—3, which is connected to the conductor 205 by the disagreement key DK—3.

By opening its contacts f, relay IT interrupts the holding circuit for relay C—3. By closing its contacts d, relay C—3 completes the energizing circuit for relay D, which operates in the manner above described to cause the apparatus at the dispatcher's office to reset to its normal position. While resetting, a short positive reset impulse is transmitted to the substation by the energization of relay P while the switch IS is moving through positions 20 to 23, inclusive. This short positive impulse effects the energization of the reset relay D' to the substation in the manner above described so that the substation apparatus is restored to its normal position and a short negative impulse is transmitted back to the dispatcher's office to energize the relay LN and thereby effect the de-energization of the reset relay D.

The lighting of the green lamp G—3 and the white lamp W—3 informs the dispatcher that the apparatus unit AU—3 has moved from its closed to its open position. The dispatcher puts out the white lamp by moving the disagreement key DK—3 to its other position and puts out the pilot light PL and effects the lighting of the start lamp STL by momentarily operating the pilot key PLK so as to open its contacts c.

If for any reason an auxiliary contact of an apparatus unit fails to make contact properly when the apparatus unit changes its positions, it is evident that the substation master indication relay I'C' or I'T', depending upon the position of the apparatus unit, cannot pick up. Therefore, no position indication can be transmitted to the dispatcher's office. In order to prevent chattering and needless wear of the relays I'C' and I'T' under this condition, the dispatcher should select another apparatus unit and after it has been selected, the apparatus should be left with the selection established, except as it is desired to perform other operations. Another unit may be selected under this abnormal condition by operating the desired select key, releasing all other select keys and momentarily operating the reset key ERK. The operation of the reset key ERK causes all of the apparatus to return to normal in the manner heretofore described. The substation equipment then attempts to re-establish a connection with the defective unit, but the dispatcher's office equipment is given preference, so that it gets the first impulse to the substation and notches the switch I'R' so that relay N'R' opens its contacts g and thereby prevents the energization of relay C'—3. Therefore, the holding circuits of the IA relays are kept open and the substation equipment responds to the code transmitted from the dispatcher's office.

In the embodiment of our invention disclosed in this application we have incorporated subject matter which is disclosed and claimed in the copending application, Serial No. 114,002, filed December 3, 1936, by Leo D. White and Clyde E. Stewart and assigned to the assignee of this application.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States is:

1. In combination, a first station, a second station, a plurality of apparatus units at said second station, means for transmitting from said first station to said second station a selecting code of impulses individual to each apparatus unit, each code comprising a different predetermined number of impulses, selecting means at said second station responsive to said selecting codes for selecting the corresponding apparatus units, means responsive to a selection at said second station for transmitting therefrom to said first station a check code of impulses individual to the selected apparatus unit, each check code comprising a different predetermined number of impulses so that the sum of the impulses in the selecting and check codes for each apparatus unit is the same predetermined value for all of the units, receiving means at said first station responsive to said check codes, and means controlled by said transmitting and receiving means at said first station for effecting the operation of the selected apparatus unit if the sum of the impulses in the transmitted selecting and check codes equals said predetermined value.

2. In combination, a first station, a second station, a plurality of apparatus units at said second station, means for transmitting from said first station to said second station a selecting code of impulses individual to each apparatus unit, each code comprising a different predetermined number of impulses, selecting means at said second station responsive to said selecting codes for selecting the corresponding apparatus units, means responsive to a selection at said second station for transmitting therefrom to said first station a check code of impulses individual to the selected apparatus unit, each check code comprising a different predetermined number of impulses so that the sum of the impulses in the selecting and check codes for each apparatus unit is the same predetermined value for all of the units, receiving means at said first station responsive to said check codes, signalling means at said first station individual to each of said apparatus units, and means controlled by said transmitting and receiving means at said first station for effecting the operation of the signalling means individual to the selected apparatus unit if the sum of the impulses in the transmitted selecting and check codes equals said predetermined value.

3. In combination, a first station, a second station, a plurality of apparatus units at said second station, means for transmitting from said first station to said second station a selecting code of impulses individual to each apparatus unit, each code comprising a different predetermined number of impulses, selecting means at said second station responsive to said selecting codes for selecting the corresponding apparatus units, means responsive to a selection at said second station for transmitting therefrom to said first station a check code individual to the selected apparatus unit and thereafter an indication impulse of a character depending upon the position of the selected apparatus unit, each check code comprising a different predetermined number of impulses so that the sum of the impulses in the selecting and check codes for each apparatus unit is the same predetermined value for all of the units, receiving means at said first station responsive to said check codes, signalling means at said stations individual to each of said apparatus units, and means controlled by said transmitting and receiving means at said first station for causing said indicating impulse to effect the selective operation of the signalling means individual to the selected apparatus unit if the sum of the impulses in the transmitted selecting and check codes equals said predetermined value.

4. In combination, a first station, a second station, a plurality of apparatus units at said second station, a multiple position switch at said first station having a normal position and a position individual to each apparatus unit, means for causing said switch to move from its normal position to the position individual to a desired apparatus unit, means operative while said switch is moving to a position individual to an apparatus unt for transmitting to said second station a code of impulses individual to the corresponding apparatus unit, selecting means at said second station responsive to said code of impulses for selecting the corresponding apparatus unit, means responsive to a selection at said second station for transmitting therefrom to said first station a check code of impulses individual to the selected apparatus unit, each of said check codes comprising a different number of impulses so that the sum of the impulses of the select and check codes is the same for each apparatus unit, a selecting switch at said first station movable to different positions in response to said check codes, operating means at said first station, and means dependent upon the relative positions of said switches at said first station after the transmission of a check code for placing the selected apparatus unit under the control of said operating means.

5. In combination, a first station, a second station, a plurality of apparatus units at said second station, a multiple position switch at said first station having a normal position and a position individual to each apparatus unit, means for causing said switch to move from its normal position to the position individual to a desired apparatus unit, means operative while said switch is moving to a position individual to an apparatus unit for transmitting to said second station a code of impulses individual to the corresponding apparatus unit, selecting means at said second station responsive to said code of impulses for selecting the corresponding apparatus unit, means responsive to a selection at said second station for transmitting therefrom to said first station a check code of impulses so that the sum of the impulses of the select and check codes is the same for each apparatus unit individual to the selected apparatus unit, each of said check codes comprising a different number of impulses, a selecting switch at said first station movable to different positions in response to said check codes, signalling means at said first station individual to each apparatus unit, and means dependent upon the relative positions of said switches at said first station after the transmission of a check code for operating the signalling means individual to the selected unit.

6. In combination, a first station, a second station, a plurality of apparatus units at said second station, a multiple position switch at said first station having a normal position and a position individual to each apparatus unit, means for causing said switch to move from its normal position to the position individual to a desired apparatus unit, means responsive tot he movement of said switch to a position individual to an apparatus unit for effecting the transmission to said second station of a code of impulses individual to the corresponding apparatus unit, selecting means at said second station responsive to said code of impulses for selecting the corresponding apparatus unit, means responsive to a selection at said second station for transmitting therefrom to said first station a check code of impulses individual to the selected apparatus unit and thereafter an indication impulse of a character depending upon the position of the selected apparatus unit, each check code comprising a different number of impulses so that the sum of the impulses of the select and check codes is the same for each apparatus unit, a selecting switch at said first station movable to different positions in response to said check codes, signalling means at said first station individual to each apparatus unit, and means dependent upon the relative positions of said switches at said first station after the termination of a check code for operating the signalling means individual to the selected unit in response to said indication impulse to indicate the position of the selected unit.

7. In combination, a first station, a second station, a plurality of apparatus units at said second station, indicating means at said first station individual to each of said apparatus units and normally indicating the position thereof, switching means for selecting any of said apparatus units for operation from said first station and for transmitting an indication impulse of a character individual to the position of the selected apparatus unit to said first station, means at said first station for initiating the operation of said switching means to select a desired apparatus unit and for causing the indicating means individual to the desired apparatus unit to discontinue the display of the position indication thereof, and means responsive to receipt at said first station of said position indication impulse corresponding to the selected apparatus unit for causing the indicating means of the desired apparatus unit to indicate whatever position the desired apparatus unit is in if the proper unit has been selected.

8. In combination, a first station, a second station, a plurality of apparatus units at said second station, indicating means at said first station individual to each of said apparatus units and normally indicating the position thereof, switching means for selecting any of said apparatus units for operation from said first station and for transmitting to said first station an indication impulse of a polarity corresponding to the position of the selected apparatus unit, means at said first station for initiating the operation of said switching means to select a desired apparatus unit and for causing the indicating means individual to the desired apparatus unit to discontinue the display of the position thereof, and means at said first station responsive to the polarity of said indication impulse corresponding to the position of the selected unit for causing the indicating means individual to the selected apparatus unit to display the position corresponding to the polarity of the indication impulse if the proper unit has been selected.

9. In combination, a first station, a second station, a plurality of apparatus units at said second station, each apparatus unit having a plurality of positions, indicating means at said first station individual to each apparatus unit for indicating the position thereof, means responsive to the movement of an apparatus unit from one position to another for effecting the transmission from said second station to said first station of a code of impulses individual to the operated apparatus unit, each code comprising a different predetermined number of impulses, selecting means at said first station responsive to said codes for selecting the indicating means individual to the operated apparatus unit, means responsive to the selection at said first station for transmitting therefrom to said second station a code of impulses individual to the selection, each code comprising a different predetermined number of impulses, receiving means at said second station selectively operated by said last-mentioned codes, means controlled by the operation of said receiving means for effecting the transmission from said second station to said first station of an indication impulse having a polarity depending upon the position of the operated apparatus unit, and means at said first station responsive to the polarity of said indication impulse for operating the selected indicating means to indicate the new position of the corresponding apparatus unit.

WALDO P. SIMPSON.
CLYDE E. STEWART.